United States Patent [19]

Gilb

[11] 4,353,664

[45] Oct. 12, 1982

[54] FREE GUSSET METAL LEDGER HANGER

[75] Inventor: Tyrell T. Gilb, Berkeley, Calif.

[73] Assignee: Simpson Manufacturing Co., Inc., San Leandro, Calif.

[21] Appl. No.: 172,002

[22] Filed: Jul. 24, 1980

[51] Int. Cl.³ .............................................. F16B 5/00
[52] U.S. Cl. .................................... 403/232.1; 52/702
[58] Field of Search ............... 403/232.1; 52/702, 289, 52/167

[56] References Cited

U.S. PATENT DOCUMENTS

| | | | |
|---|---|---|---|
| 922,215 | 5/1909 | Tuteur | 403/232.1 |
| 1,097,934 | 5/1914 | Price | 52/702 |
| 3,989,398 | 11/1976 | Wendt | 403/232.1 |

Primary Examiner—Andrew V. Kundrat
Attorney, Agent, or Firm—James R. Cypher

[57] ABSTRACT

A free gusset metal ledger hanger for attachment to metal ledgers wherein the hanger consists briefly of a top flange adapted for connection to the upper face of the outstanding ledger leg, a depending flange attached to the top flange and extending downwardly therefrom, first and second stirrup members attached to the depending flange and extending downwardly therefrom and adapted for holding a structural beam member, and a first gusset member operatively ridgedly connected to the top flange and having a top edge in registration with the lower face of the outstanding leg of the ledger and having a side face in close fitting relation to the outward face of the lower leg of the metal ledger.

6 Claims, 14 Drawing Figures

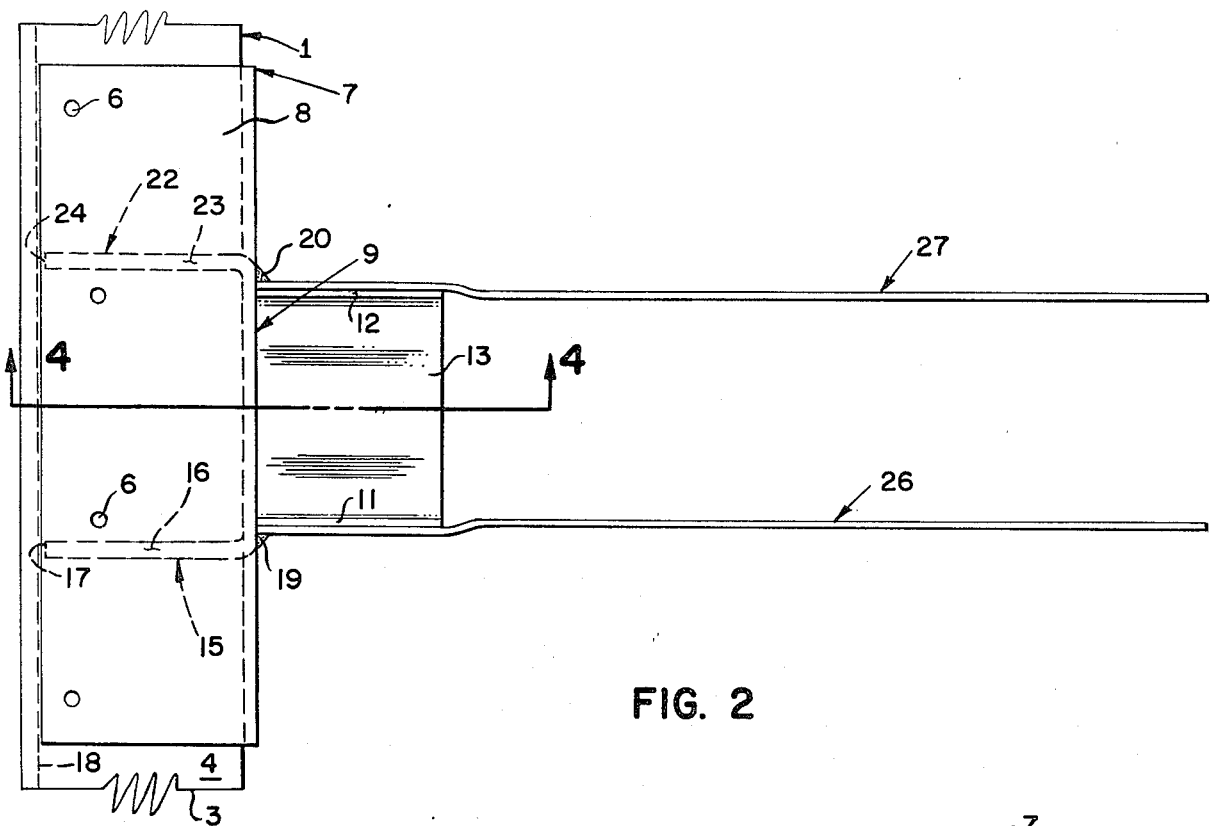
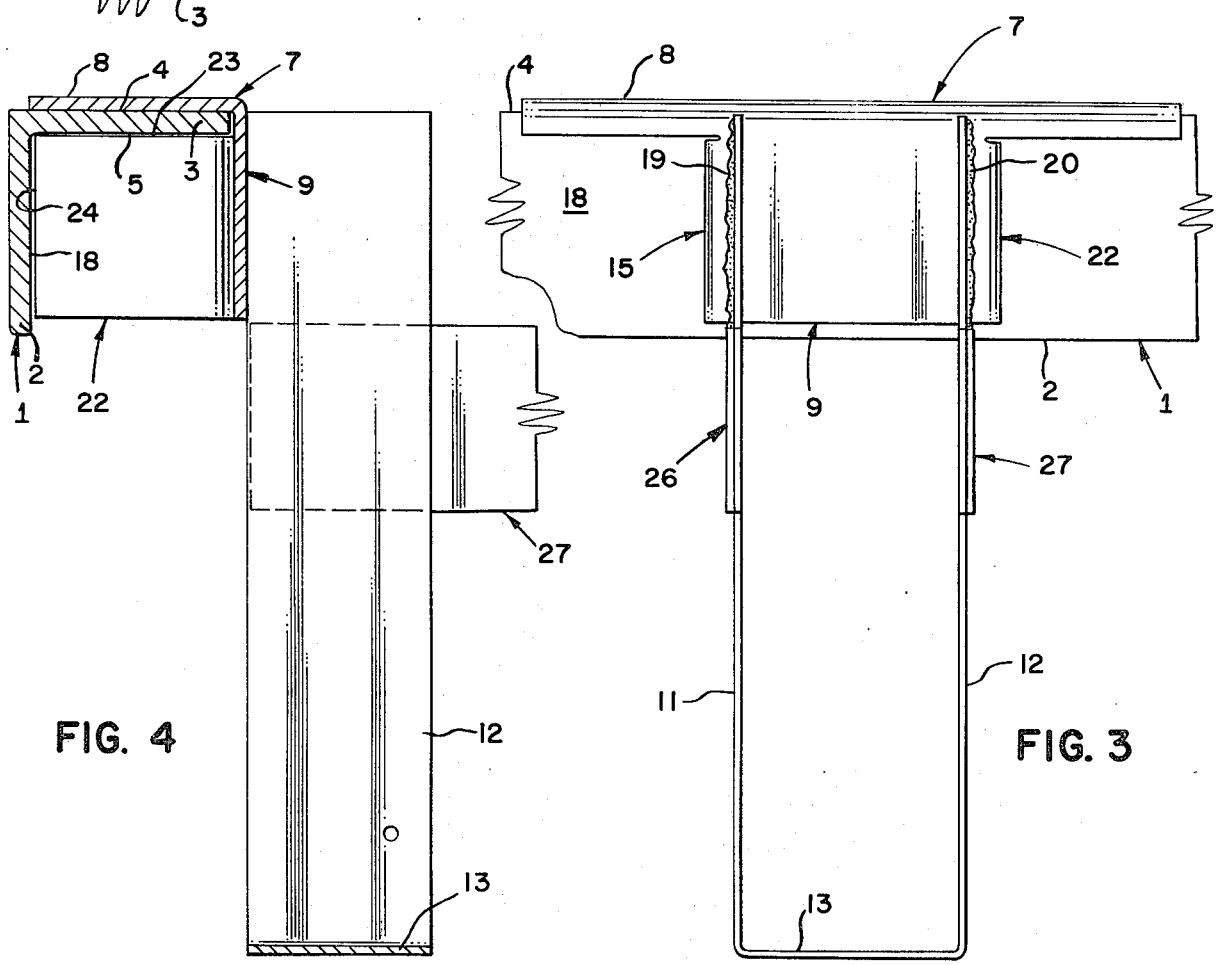

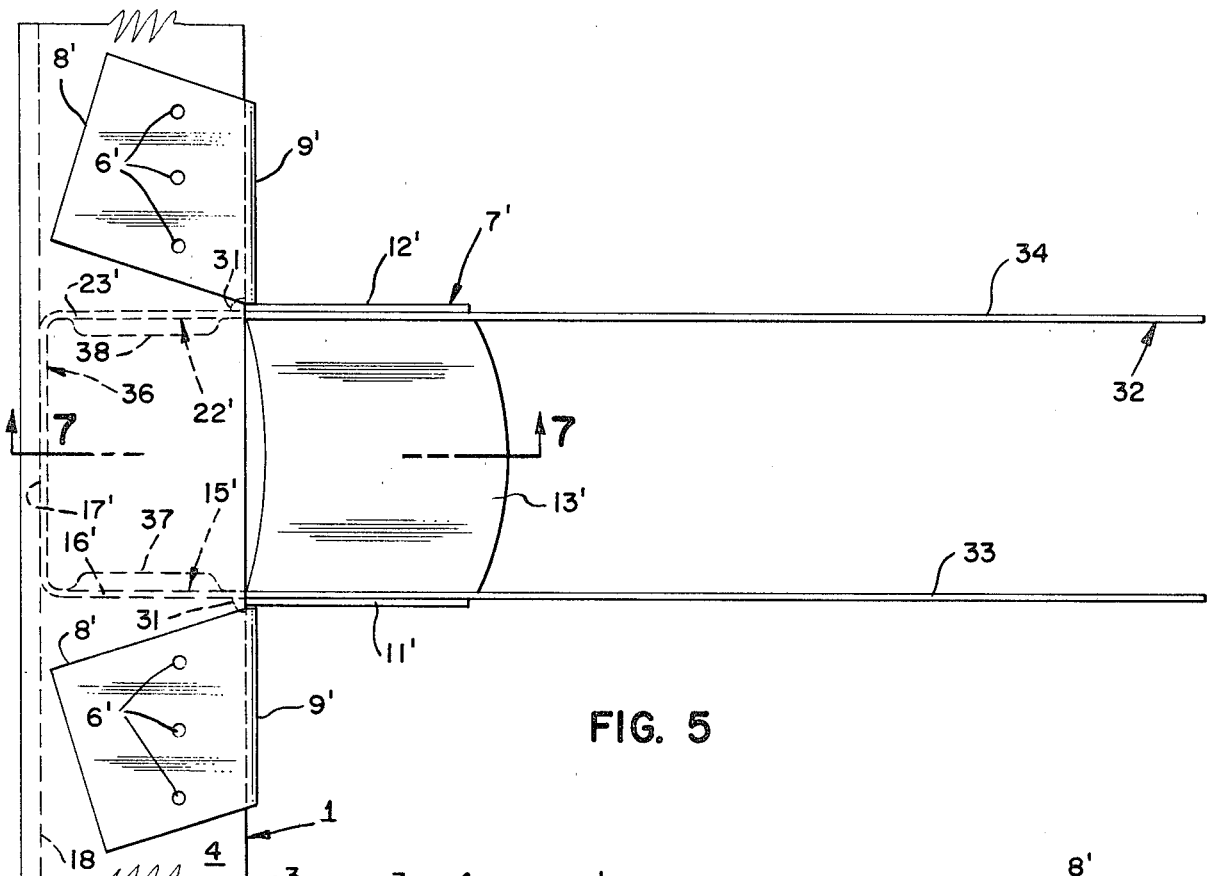
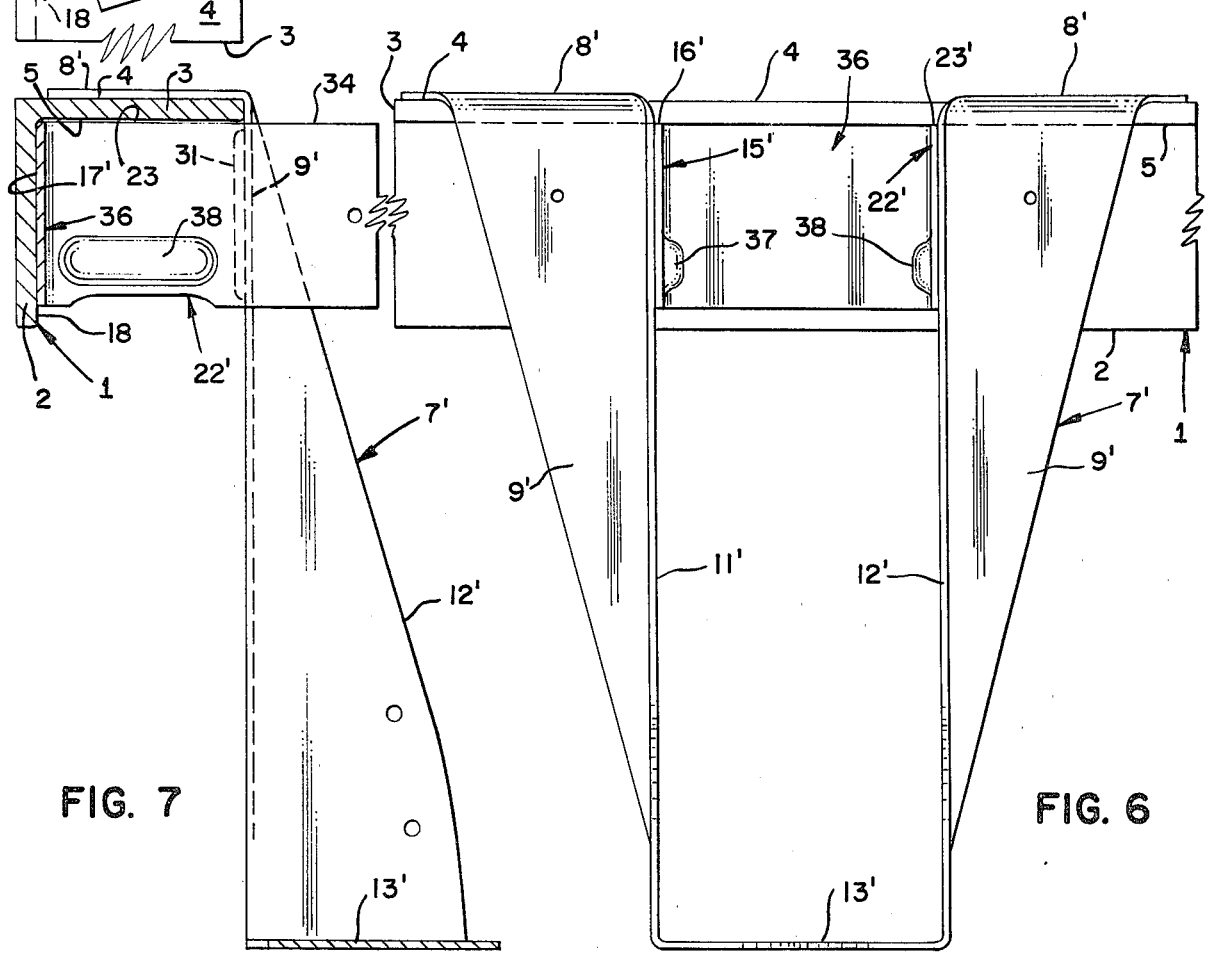

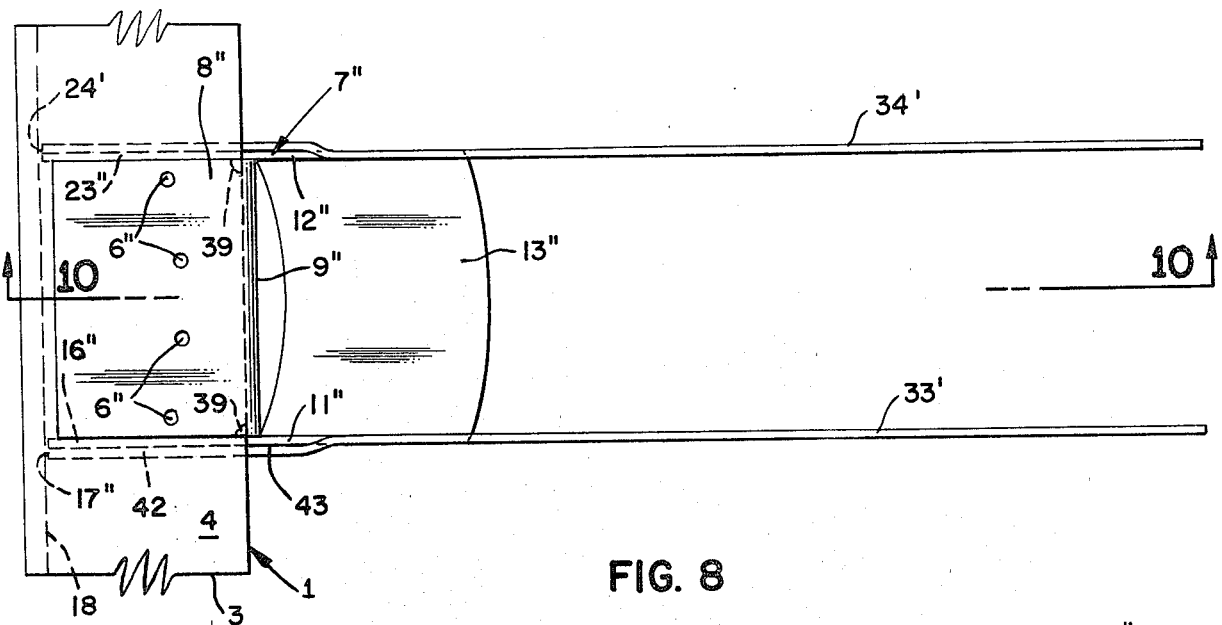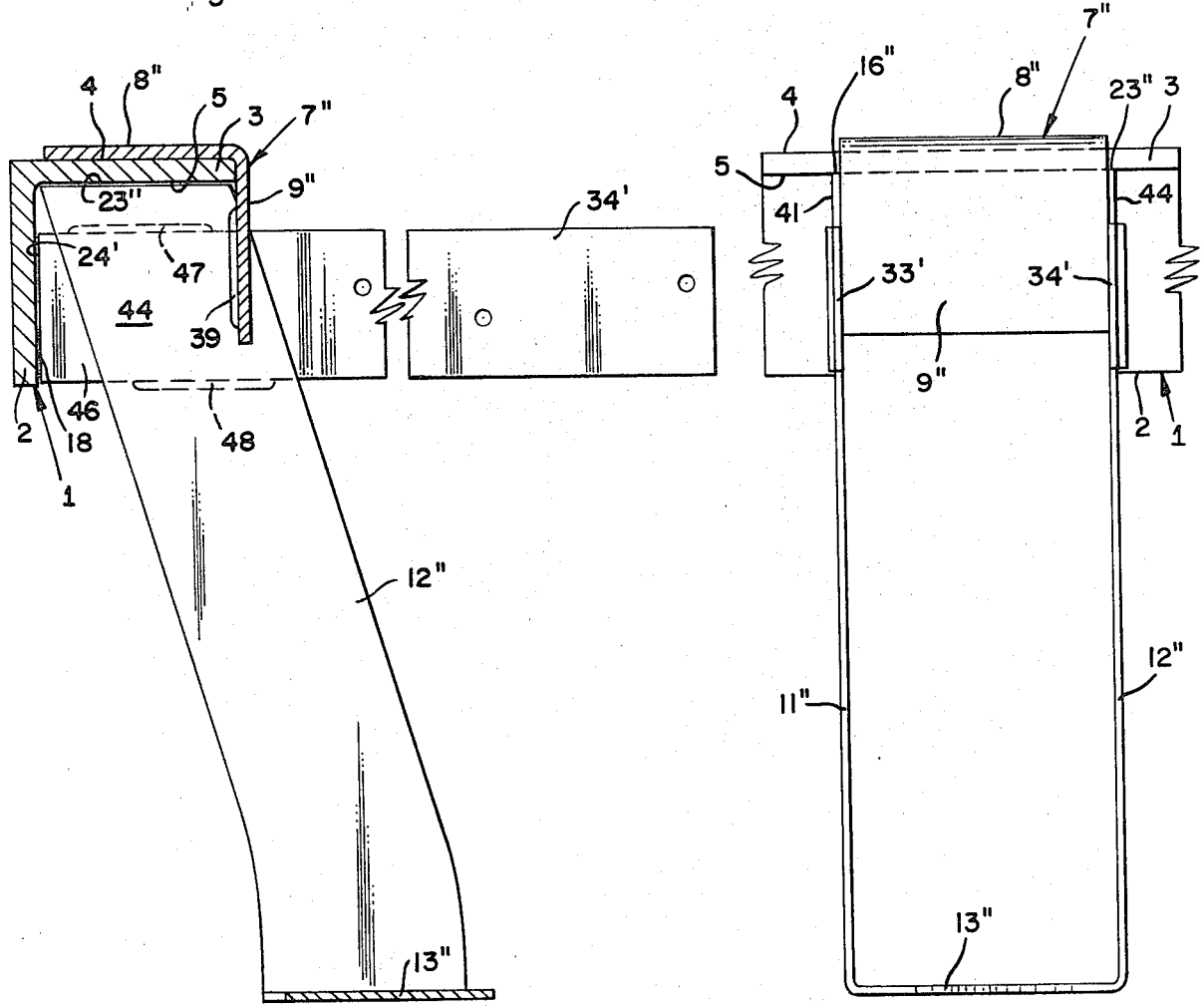

FREE GUSSET METAL LEDGER HANGER

BACKGROUND OF THE INVENTION

Two alternatives are generally used for providing the ledger support at the roof line (and in some cases floor lines) around the inside perimeter of buildings and/or at internal concrete or masonry walls. These are either wood ledgers such as 4×14's or metal ledgers such as angle or U-shaped, both attached to the concrete or masonry wall by means of anchor bolts.

The wood ledger has historically dominated until recent years, primarily due to the ease of attachment it provides for intersecting plywood, purlins, and other structural members attached to the ledger. More recently the wood ledger systems have been under attack because of their excessive costs, certain deficiencies in respect to seismic tie anchorage, and the practical difficulties encountered in making the concrete to outstanding member connection without an intermediate wood connection, as now required by seismic codes.

Several years ago, the metal ledger was rapidly making its appearance, typified by $3 \times 3 \times \frac{1}{4}$ inch up through $3 \times 6 \times \frac{1}{4}$ inch angled sections, as well as U-channel sections of approximately the same net section. In part, this development was made practical by the improvement in gun, air driven or several drilled screw methods for attaching plywood, hangers, and other hardware to the metal ledger.

About three (3) years ago, the metal ledger system received a bad set back when a series of tests disclosed that when a typical purlin type hanger was attached to such an angle or U-channel, the loading radically deflected the outstanding leg of the angle or U-channel at the points of concentrated loading. Therefore, in order to use metal ledger angle or U-sections, it became necessary to provide costly field welding of gussets (metal plates) at the point of the concentrated loads to prevent deflection of the outstanding leg of the ledger member. This requirement tended to throw the balance of economic value back towards use of the wood ledger.

More recently, the economic balance has shifted back to the use of the metal ledgers by virtue of the fact that the net section of the metal ledgers may be calculated, approximately, in lieu of an equal section of reinforcing steel in the concrete or masonry walls otherwise required as bond steel in such structures. This economic factor at present is sufficient to overcome the cost of field welding gussets so that there is a sudden surge of metal ledger designs being specified.

SUMMARY OF THE INVENTION

The gist of the present invention is the provision of a gusset which interlocks with the outstanding leg and the lower leg of the metal ledger and is formed from a portion of the hanger such as the depending flange, extended stirrup member or an extended seismic strap.

The object of the present invention is to obviate the problem of ledger bending without appreciably increasing the cost of the metal hanger.

A further object is to provide a free gusset for a metal hanger as set forth in the present invention which requires no field welding of the gussets.

BRIEF DESCRIPTION OF THE DRAWINGS

FIG. 2 is a top plan view of the hanger shown in FIG. 1.

FIG. 3 is a front elevation view of the hanger shown in FIG. 1.

FIG. 4 is a partial cross sectional view of the hanger shown in FIG. 2 taken generally along line 4—4.

FIG. 5 is a top plan view of another hanger incorporating the present invention.

FIG. 6 is a front elevational view of the hanger shown in FIG. 5.

FIG. 7 is a partial cross sectional view of the hanger shown in FIG. 5 taken generally along line 7—7.

FIG. 8 is a top plan view of still another hanger incorporating the present invention.

FIG. 9 is a front elevational view of the hanger shown in FIG. 8.

FIG. 10 is a portion cross sectional view of the hanger shown in FIG. 8 taken generally along line 10—10.

DESCRIPTION OF THE PREFERRED EMBODIMENTS

Figure 1:
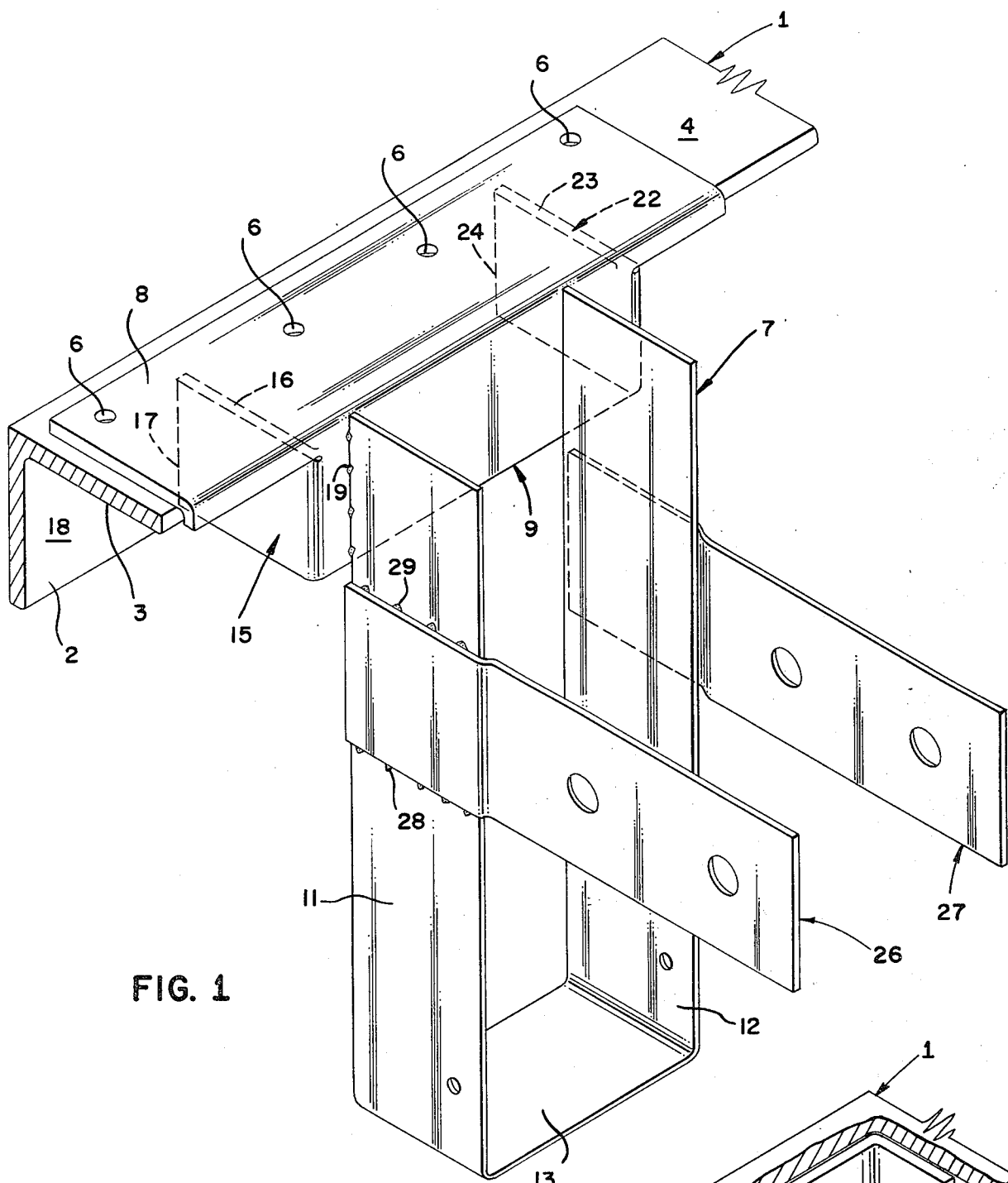
FIG. 1 is a perspective view of a hanger incorporating the present invention attached to a metal ledger angle.

The free gusset metal ledger hanger of the present invention attaches to a metal ledger 1 which includes a lower leg 2 attached to the face of a wall and an outstanding leg 3 having an upper face 4 and a lower face 5.

Referring to the hanger 7 shown in FIGS. 1 through 4, the top flange 8 is adapted for connection to the upper face 4 of the outstanding ledger leg 3. A depending flange 9 attached to the top flange 8 extends downwardly therefrom. First and second stirrup members 11 and 12 are attached to the depending flange 9 and extend downwardly therefrom and are adapted for holding a structural beam member (not shown). Preferably the hanger has a seat member 13. A first gusset member 15 is operatively and ridgedly connected to the top flange 8 and is formed with a top edge 16 in registration with the lower face 5 of the outstanding leg 3 of the ledger and has a side edge 17 in close fitting relation to the outward face 18 of the lower leg 2 of the metal ledger 1.

As shown in FIGS. 1 through 4, the gusset member is an integral part of the depending flange 9. As a specific example, the gusset member may be constructed from a purlin hanger having a top flange element $2\frac{3}{4}''$ a depending flange $2\frac{3}{4}'' \times 7$ gauge. The stirrup elements may be $2\frac{1}{2}'' \times 12$ gauge. The gusset member may be made by cutting the depending flange 9 3"1/16th" down from the bend of the angle. The gusset is then bent 90° so that it creates a gusset $2\frac{3}{4}''$ long. The stirrups are attached to the depending flange by standard welds 19 and 20.

Preferably, a second gusset member 22 is integrally connected to the top flange 8 and has a top edge 23 in registration with the lower face 5 of the outstanding leg 3 of the ledger and has a side edge 24 in close fitting relation to the outward face 18 of the lower leg 2 of the ledger 1. The first and second gusset members 15 and 22 are located adjacent the stirrup members 11 and 12. Preferably, openings 6 are formed in top flange 8 for insertion of fasteners therethrough and into metal ledger 1.

The seismic straps 26 and 27 are attached to the stirrups by welds 28 and 29. The straps are connected to the held beam by suitable fasteners to satisfy seismic building code requirements.

FIGS. 5 through 7 illustrate an alternate free gusset metal ledger hanger 7' which incorporates the free gusset teachings previously described and illustrated in hanger 7 shown in FIGS. 1 through 4. Top flanges 8' are adapted for connection to the upper face 4 of the outstanding ledger leg 3. Depending flanges 9' attached to the top flanges 8' extend downwardly therefrom. First and second stirrup members 11' and 12' are attached to the depending flanges 9' and are adapted for holding a structural beam member (not shown). A first gusset member 15' is operatively ridgedly connected to the top flange 8' by being directly connected to stirrup member 11' by weld 31. First gusset member 15' has a top edge 16' in registration with the lower face 5 of the outstanding leg 3 of the ledger and a side face 17' in close fitting relation to the outward face 18 of the lower leg 2 of the metal ledger.

The first and second gusset members 15' and 22' are formed from a U-shaped member 32 in which the legs 33 and 34 also form seismic straps which are connected to a carried beam (not shown). The base 36 of the U-shaped member forms the side face 17' of the gusset member.

Detents 37 and 38 may be formed in the gusset portions 15' and 22' for stiffening purposes.

Preferably hanger 7' is formed with a seat member 13' integrally connected to stirrup members 11' and 12'. For ease of installation, openings 6' may be formed in top flanges 8' or the insertion of fasteners into the metal ledger.

Still another form of hanger 7" is illustrated in FIGS. 8 through 10. Hanger 7" incorporates the same free gusset principal of the hangers previously described. A top flange 8" is adapted for connection to the upper face 4 of the outstanding ledger leg 3. A depending flange 9" is attached to the top flange 8" and extends downwardly therefrom. First and second stirrup member 11" and 12" are attached to the depending flange 9" by weld 39 and extend downwardly therefrom and are adapted for holding a structural beam member (not shown). The first gusset member is composed of two parts. An extended portion 41 of stirrup 11" which has a top edge 16" in registration with the lower face 5 of the outstanding leg 3 of the ledger forms the first part. The extended portion 41 is operatively rigidly connected to the top flange 8" and depending flange 9". The other member making up the first gusset member is end portion 42 of seismic strap 33' which has a side face 17" in close fitting relation to the outward face 18 of the lower leg 2 of the metal ledger 1.

The first seismic strap 33' is adapted for connection to the structural beam member and is connected to the outside face 43 of the stirrup 11".

The second gusset member is also formed from a combination of two members; namely, extended stirrup portion 44 of second stirrup member 12" and end portion 46 of seismic strap 34'. Extended stirrup portion 44 has a top edge 23" in registration with the lower face 5 of the outstanding leg 3 of the ledger 1. The second seismic strap 34' is connected to the second stirrup 12" by welds 47 and 48. The seismic strap 34' has an end face 24' in close fitting relation to the outward face 18 of the lower leg 2 of the metal ledger 1. The depending flange 9" is located entirely between the stirrup members 33' and 34'.

Figure 11:
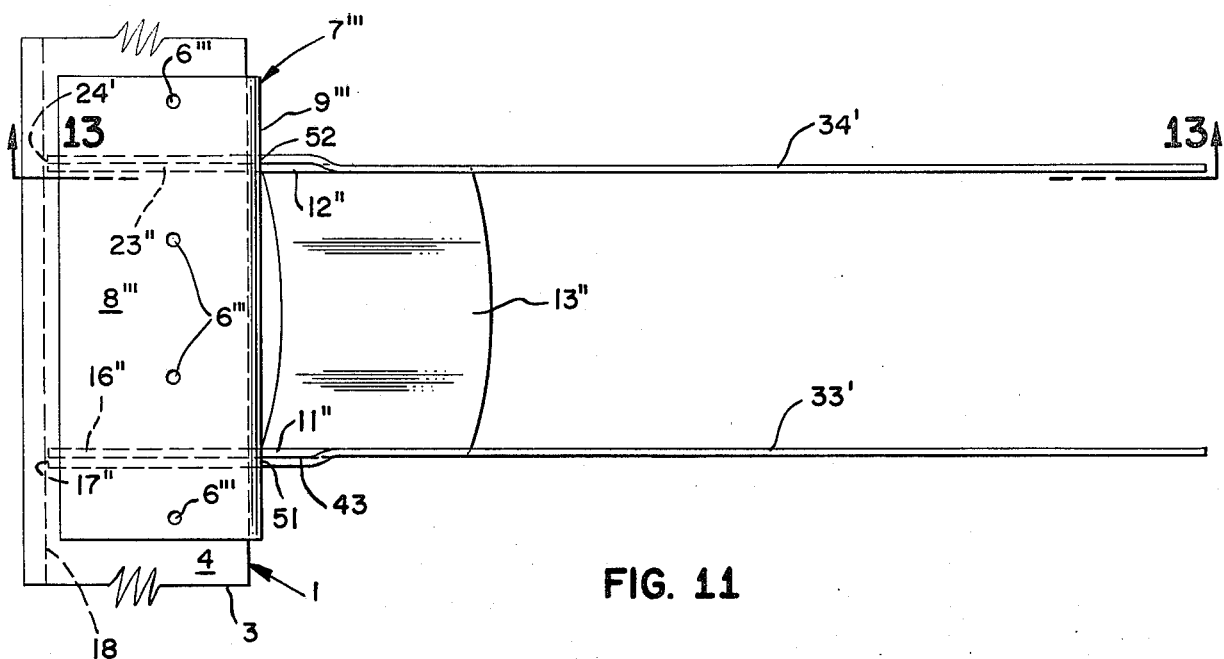
FIG. 11 is a variation of the hanger shown in FIG. 8 incorporating the present invention.
Figure 13:
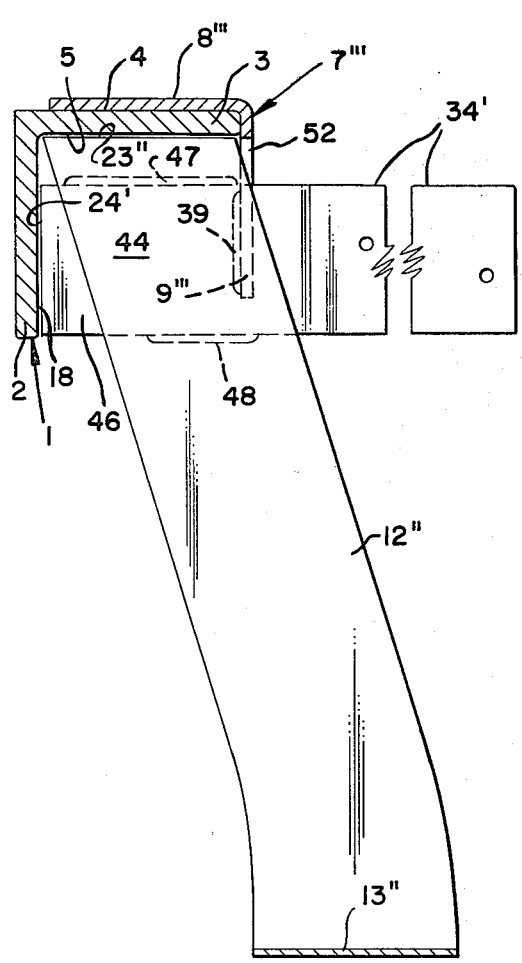
FIG. 13 is a partial cross sectional view of the hanger shown in FIG. 11 taken generally along line 13—13.
Figure 12:
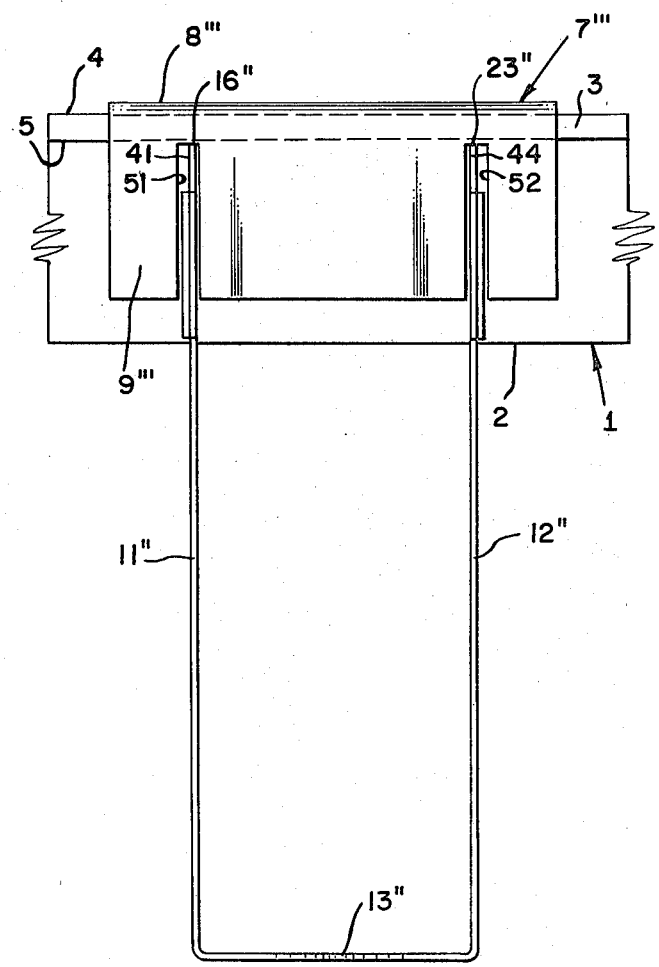
FIG. 12 is a front elevational view of the hanger shown in FIG. 11.

The hanger 7'" illustrated in FIGS. 11-13 is a variation of the hanger 7" illustrated in FIGS. 8 through 10. A description of parts which are identical are not repeated and only the differences between the two hangers will be described. In hanger 7'", the top flange 8'" and depending flange 9'" extend laterally beyond stirrup members 11" and depending flange 9'" is formed with vertically extending first and second slots 51 and 52. The first seismic strap 33' extends through the first slot 51 and has an end face 17'. The second seismic strap 34' which is connected to the second stirrup member 12" extends through the second slot 52 and has a side edge 24' in close fitting relation to the outward face 18 of the lower leg 2 of the metal ledger 1.

The operation of all of the hangers described and illustrated is essentially the same. The gusset members take a slightly different configuration in each of the hangers but in each and every case they are an integral part of the hanger. The geometry of the configuration is such that with load applied to the stirrups of the hanger, the moment arm of the load is the distance of the outstanding leg 3 of the metal ledger 1. Prior to the present invention, it was this outstanding leg which failed in bending. In the present case, the free gussets provide a stiffening of the outstanding leg of the ledger member so that the moment load is transferred to shear load. In respect to the attaching pins or screws, the calculated limit of value, in a generaly way, is therefor, either such pin shear value or the lower portion of the gusset expressed as L/R. A secondary intermediate is present as an aspect of the free gusset and has to be considered. As load is increased, it is clear that the load reaction is taken by the rigidity of the outstanding leg of the ledger member plus the ridgity of the angle of the hanger top flange. This. as noted previously, is not sufficient to take all of the load. The free gusset, however, permits slight bending under the load to the point where the sine of the angle between a line parallel to the top of the gussets and the slightly bending outstanding leg of the ledger member is resolved by the shear resistance of the attaching pins. In practice, it has been observed that this occurs slightly past ⅛ inch deflection. For calculating purposes, it can be assumed that the vertical ends of the gusset members are in frictionless bearing against the outward face of the lower leg of the ledger member.

Figure 14:
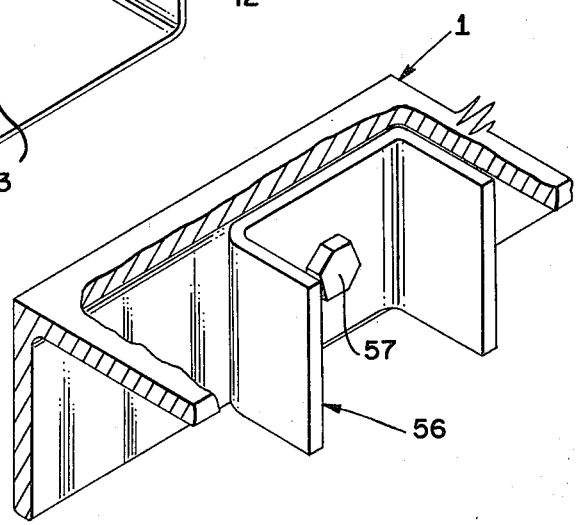
FIG. 14 is a perspective view with portions cut away for purposes of clarity showing a means of stiffening the lower leg of the ledger.

When the hangers of the present invention are used and tested as a seismic device, and in some cases even for normal loading in view of the moment arm, the ledger member has a secondary line of weakness, namely, a tendency to bend along the bolt line attaching it to the wall. As shown in FIG. 14 this tendency can be very economically overcome by providing U-shaped special washers 56 for the bolts 57 immediately adjacent to the hanger locations.

I claim:

1. A free gusset metal ledger hanger for attachment to a metal ledger 1 wherein the metal ledger includes a lower leg 2 attached to the face of a wall and an outstanding leg 3 having an upper face 4 and a lower face 5, said ledger hanger comprising:
  a. a top flange 8 adapted for connection to said upper face 4 of said outstanding ledger leg 3;
  b. a depending flange 9 attached to said top flange 8 extending downwardly therefrom;
  c. first and second stirrup members 11 and 12 attached to said depending flange 9 extending downwardly therefrom and adapted for holding a structural bean member;
  d. a first gusset member 15 operatively and ridgedly connected to said top flange 8 having a top edge 16 in registration with said lower face 5 of said outstanding leg 3 of said ledger and having a side edge 17 in close fitting relation to said outward face 18 of said lower leg 2 of said metal hanger 1; and
  e. said gusset member is an integral part of said depending flange 9.

2. A free gusset metal ledger hanger as described in claim 1 comprising:
  a. a second gusset member 22 integrally connected to said top flange 8 having a top edge 23 in registration with said lower face 5 of said outstanding leg 3 of said ledger and having a side edge 24 in close fitting relation to said outward face 18 of said lower leg 2 of said ledger 1; and
  b. said first and second gusset members 15 and 22 are located adjacent said stirrup members 11 and 12.

3. A free gusset metal ledger hanger as described in claim 1 wherein;
  a. said first stirrup member 11″ includes a top edge which forms said top edge 16″ of said first gusset member; and
  b. a first seismic strap 33′ adapted for connection to said structural beam member is connected to said outside face 43 of said stirrup 11″ and has an end edge 17′ forming said side face of said first gusset member.

4. A free gusset metal ledger hanger as described in claim 3 comprising:
  a. second stirrup member 12″ has a top edge 23″ in registration with said lower face 5 of said outstanding leg 3 of said ledger 1;
  b. a second seismic strap 34′ connected to said second stirrup 12″ having an end face 24′ in close fitting relation to said outward face 18 of said lower leg 2 of said metal hanger 1; and
  c. said depending flange 9″ is located entirely between said stirrup members 33′ and 34′.

5. A free gusset metal ledger hanger as described in claim 3 comprising;
  a. said depending flange 9‴ extends laterally beyond said stirrup members 33′ and 34′0 and is formed with vertically extending first and second slots 51 and 52;
  b. said first seismic strap 33′ extends through said first slot 51; and
  c. a second seismic strap 34′ connected to said second stirrup 12″ extends through said second slot 52 and has a side edge 24′ in close fitting relation to said outward face 18 of said lower leg 2 of said metal ledger 1.

6. A free gusset metal ledger hanger for attachment to a metal ledger 1 wherein the metal ledger includes a lower leg 2 attached to the face of a wall and an outstanding leg 3 having an upper face 4 and a lower face 5 said ledger hanger comprising:
  a. top flanges 8′ adapted for connection to said upper face 4 of said outstanding ledger leg 3;
  b. depending flanges 9′ attached to said top flanges 8′ extending downwardly therefrom;
  c. first and second stirrup member 11′ and 12′ attached to said depending flanges 9′ extending downwardly therefrom and adapted for holding a structural beam member;
  d. first and second gusset members 15′ and 22′ operatively and ridgedly connected to said top flanges 8 having top edge 16′ and 23′ in registration with said lower face 5 of said outstanding leg 3 of said ledger and having a side face 17′ in close fitting relation to said outward face 18 of said lower leg 2 of said metal ledger 1; and
  e. said first and second gusset members 15′ and 22′ are formed from a U-shaped member 32 having legs 33 and 34 and a base 36 directly connected to said stirrup members 11′ and 12′ and said base 36 of said U-shaped member forms said side face 17′ of said gusset members which is located in close fitting relation to said outward face 18 of said lower leg 2 of said metal ledger 1.

* * * * *